Patented Feb. 14, 1939

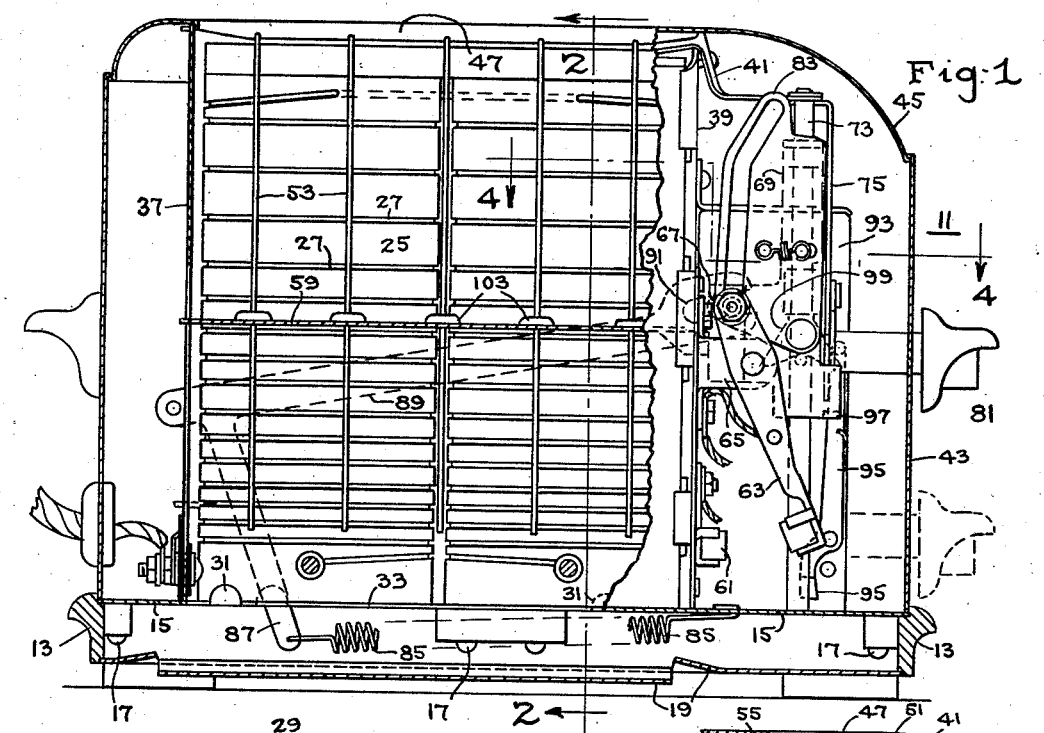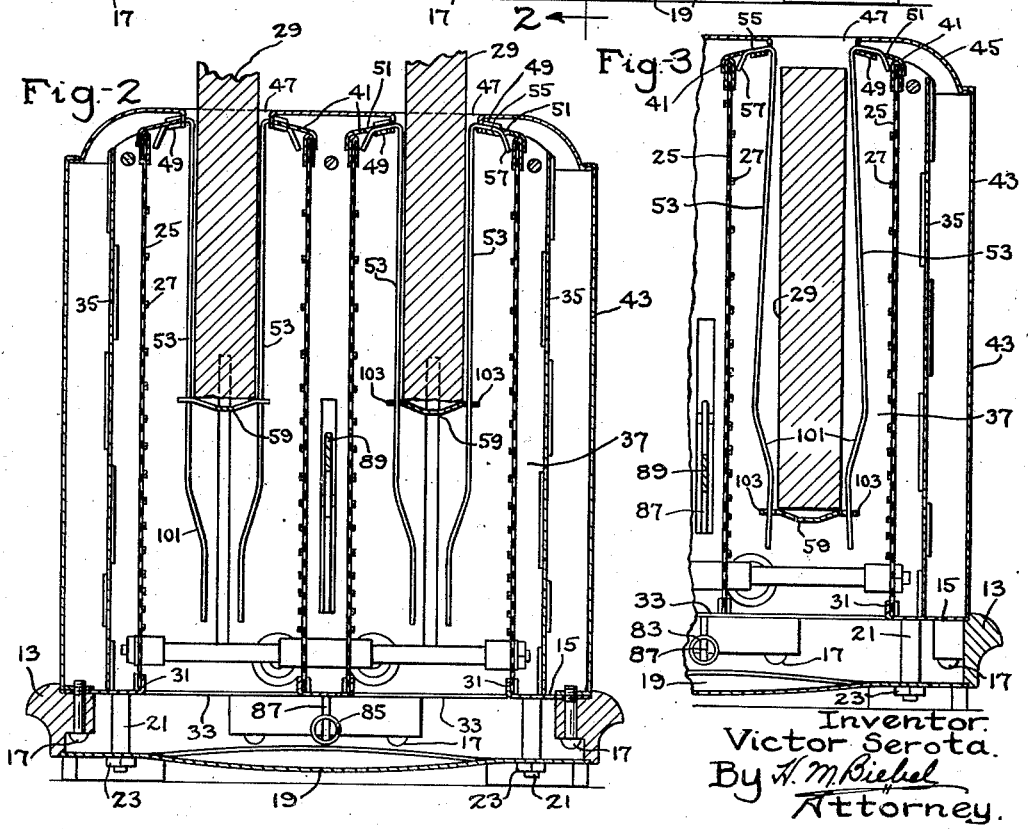

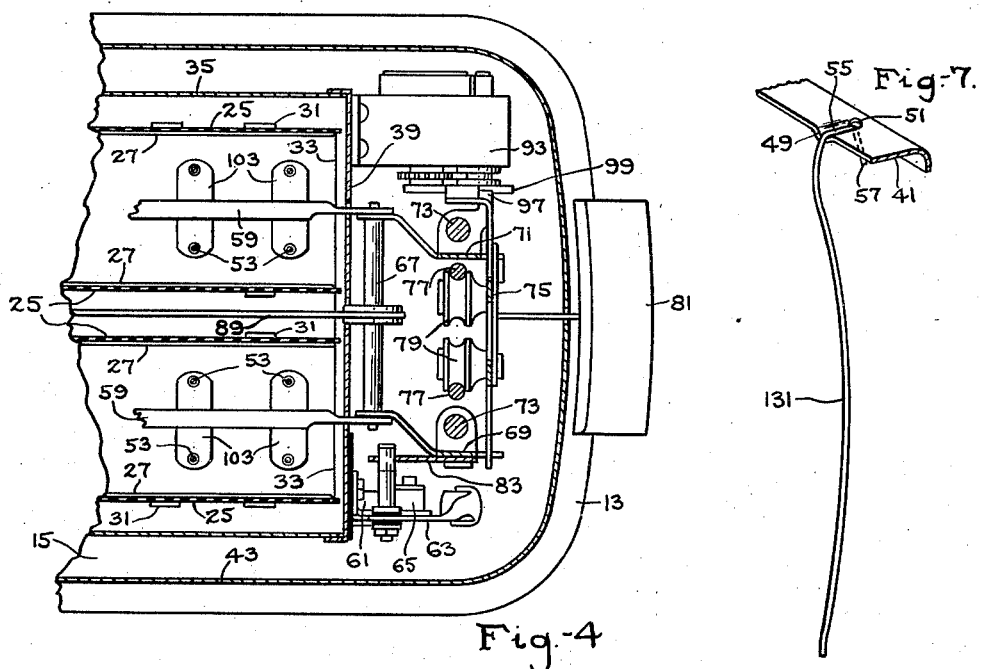
Fig.-4
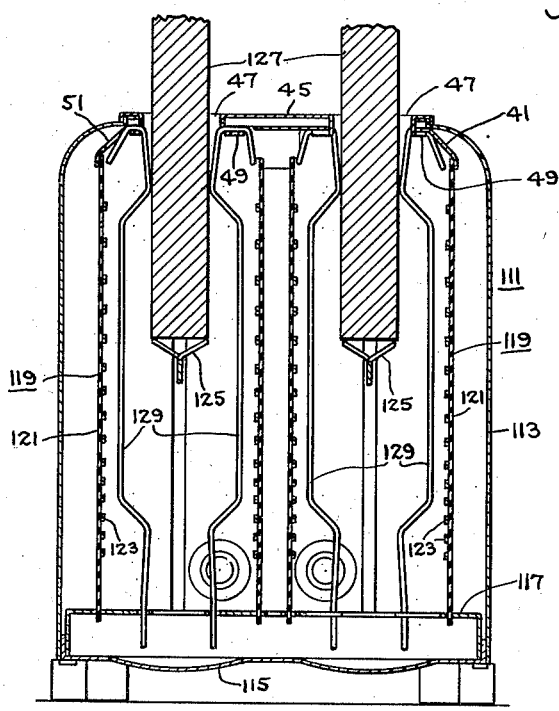
Fig.-5
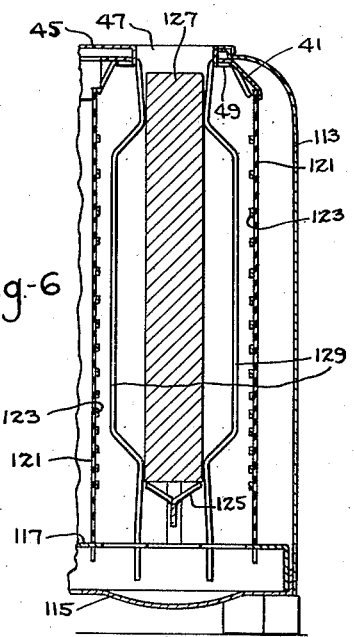
Fig.-6
Fig.-7
Inventor:
Victor Serota
By H. M. Biefel
Attorney.

2,147,388

UNITED STATES PATENT OFFICE 2,147,388

TOASTER GUARD WIRE

Victor Serota, Minneapolis, Minn., assignor to McGraw Electric Company, Chicago, Ill., a corporation of Delaware Application November 18, 1937, Serial No. 175,265

5 Claims. (Cl. 53—5)

My invention relates to electric toasters and particularly to means for positioning a slice of bread in such toasters.

An object of my invention is to provide a guard wire of such shape as to prevent the occurrence of untoasted areas on a slice of bread being toasted.

Another object of my invention is to provide guard wires in an electric toaster cooperating with a movable bread slice support to position a slice of bread relatively to heating means adjacent thereto, the guard wires having such shape that they will engage with only the top and bottom edges of a slice of bread.

Other objects of my invention will more fully appear from the following description and the accompanying drawings and will be pointed out in the appended claims.

In the drawings,

Fig. 1 is a view in vertical longitudinal section through a toaster including my invention, Fig. 2 is a view in vertical lateral section therethrough taken on the line 2—2 of Fig. 1, Fig. 3 is a fragmentary view in vertical lateral section similar to Fig. 2 but showing parts thereof in a different position, Fig. 4 is a fragmentary view in horizontal section therethrough, taken on the line 4—4 of Fig. 1, Fig. 5 is a view in vertical lateral section through a modified form of toaster including my invention, Fig. 6 is a fragmentary view in vertical lateral section similar to Fig. 5 but showing parts in a different position, and Fig. 7 is a fragmentary view in perspective of a further modification of a guard wire and its support.

Referring first to Figs. 1 to 4 inclusive I have there illustrated an automatic oven type vertical toaster 11 which toaster includes a skeleton base frame 13 which may be made of molded composition material and which has directly mounted thereon a base plate 15 which may be secured to the frame 13 by a plurality of screws 17. I provide also a crumb tray 19 which may be held against the frame 13 as by cooperating studs 21 and nuts 23 thereon.

The toaster 11 includes also one or more planar electric heating elements, each comprising substantially vertically extending sheets 25 of electric-insulating material such as mica, on which is wound a suitable resistor wire or strip 27, a pair of such heating elements being spaced apart a suitable distance to receive therebetween a slice of bread 29 to be toasted. I wish to point out that, as shown particularly in Fig. 1 of the drawings, each of these heating elements is of the extended-area and substantially uniformly distributed type. The base plate 15 may be so shaped as to provide pairs of upwardly extending lugs 31 to receive therebetween the lower edges of the respective heating elements. An opening 33 is provided in the base plate extending substantially longitudinally of the toaster for each slice of bread and while I have shown a two-slice toaster I do not desire to be limited thereto since the device more particularly constituting my invention is applicable to toasters adapted to toast any number of slices of bread.

Baffle plates or side walls 35 extend longitudinally of the toaster spaced from and outside of the outermost heating elements. I provide further a rear intermediate plate 37 and a front intermediate plate 39, the front and the rear intermediate plates cooperating with the outermost heating elements to constitute a toasting chamber, the base plate 15 constituting a partial bottom closure for the toasting chamber. Top frame plates 41 cooperate with the front and the rear intermediate wall plates 39 and 37 to hold them in proper spaced positions relatively to each other. It is to be noticed that these top frame plates are provided with apertures through which the slices of bread 29 may be inserted into and removed from the toasting chamber. An outer casing 43 rests upon the base plate 15 and cooperates with cover 45 to suitably enclose the structure thus far described. Fig. 2 will show that the cover 45 is provided with openings 47 therein registering with the openings in the top frame plates to permit of insertion and removal of slices of bread.

The top frame plates 41, and particularly the longitudinally extending side portions thereof are provided with laterally extending depressions or recesses 49 ending at their inner ends in openings 51 for the reception of guard wires 53 the upper ends of which have laterally extending portions 55 as well as return bent portions 57. The guard wires are individually supported by the top frame plate 41 and longitudinal movement of the top end portion of any guard wire is prevented by the interfit of portion 55 in the recess 49. It may be noted that the depending portion 57 of each guard wire is adapted to prevent lateral movement of the upper end of an adjacent heating element as will be noted particularly by reference to Fig. 2 of the drawings.

The electric and automatic toaster shown in

Figs. 1 to 4 particularly is of the kind in which an operator depresses a bread slice support 59 which is vertically movable in the toasting chamber, being in non-toasting position when in its uppermost position as shown in Fig. 1 of the drawings, and in toasting position when adjacent the bottom of the toasting chamber, as shown in Fig. 3 of the drawings. A toaster of this kind is also provided with a control switch for the electric heating units. This switch includes a substantially fixed contact member 61 insulatedly supported on the front plate 39 and a pivotally mounted switch arm 63 also insulatedly supported on the front plate 39 as by a bracket 65.

The bread slice supports 59 are secured together as by a horizontally extending rod 67 (see Fig. 4) and are connected to two sliders 69 and 71 which sliders have vertical movement on a pair of outer standards 73 suitably supported between the outer casing and the front intermediate wall 39. A carriage 75 is arranged to have vertical movement on a pair of inner standards 77, rollers 79 being provided on the carriage to hold the carriage in proper operative position relatively to the standards 77 and to reduce the friction of the vertical movement therebetween. An actuating knob 81 is carried by carriage 75 at the front of the casing 43 whereby an operator may move the bread slice supports from non-toasting to toasting position. Slider 69 is provided with a slotted plate 83 thereon cooperating with the pivotally mounted switch arm 63 so that when knob 81 is depressed switch arm 63 will be moved into engagement with fixed contact 61.

A coil spring 85 positioned between the base plate 15 and crumb tray 19 has one end thereof connected to the base plate 15 while its other end is connected to the outer end of a short arm 87 of a bellcrank lever pivotally mounted on the rear intermediate plate 37 and including a longer arm 89 the front of which is slotted as at 91 to receive the connecting rod 67. The spring 85 therefore biases the bread slice supports to non-toasting position and also biases the switch arm to open position.

An automatic means for terminating the toasting operation includes a mechanical timer 93 which mechanical timer includes a spring which is wound up when knob 81 is moved in a downwardly direction. The timer 93 is provided with a latch 95 which latch is adapted to engage with a suitable lug 97 on slider 71 so that an operator moving the knob 81 downwardly will cause lug 97 to engage under the lower end of pivotally mounted latch arm 95 to retain the bread slice supports in toasting position and the switch in energizing position until the timer has moved a cam member 99 associated with carriage 75 into substantially its initial or upper position when it becomes effective by engagement with the upper end of latch 95 to cause a turning movement thereof and its disengagement with lug 97, permittinng the coil spring to move the bread slice support to upper or non-toasting position and the switch to open position whereby the toasting operation is terminated.

These details constitute no part of my present invention and reference may be had to Ireland Patent No. 2,001,362 for a clear description of these details.

I have found that the use of guard wires which extend substantially straight and relatively close to the surface of a slice of bread being toasted results in shadows or untoasted areas and guard wires embodying my invention which overcome this drawback will now be described.

Referring particularly to Figs. 2 and 3 of the drawings I have there illustrated one form of guard wire embodying my invention, each guard wire having an intermediate portion bowed outwardly or away from a slice of bread positioned between the respective pairs of guard wires which are provided to properly position a slice of bread substantially centrally of or midway between the spaced heating units which are adapted to be operated at relatively high temperatures to provide radiant heat for toasting a slice of bread located therebetween. As shown in Figs. 2 and 3 of the drawings I provide what amounts to a bent-in portion 101 on each guard wire, each bent-in portion comprising an angularly extending portion and then a straight end portion. It will be noted that these guard wires have interfitting slidable engagement with lateral lugs 103 on the bread slice supports 59.

The initial position of the guard wires is as in Fig. 2 of the drawings which shows the bread slice supports 59 in their upper position while Fig. 3 shows the positions of the guard wires when the bread slice supports 59 are in their lower or toasting position. It will be noted that the guard wires 53 are so shaped that, with the bread slice support in its lowermost or toasting position, a slice of bread 29 is engaged by the guard wires at only its upper and lower edges while the intermediate portion of the guard wire between the upper and lower edges of a slice of bread is spaced some distance away from the surface of the bread so that, particularly with a substantially uniformly distributed resistor as the source of heat, the radiant heat impinges on substantially the entire surface of the slice of bread and thereby avoids the occurrence of guard wire shadows or of untoasted areas caused by the guard wires.

Referring now to Figs. 5 and 6 of the drawings I have there illustrated a somewhat different form of oven type electric toaster which is not automatic in the same manner as was hereinbefore described for the device shown in Figs. 1 to 4. A toaster 111 includes an outer casing 113, a base plate 115, an inner bottom plate 117 and a plurality of pairs of planar heating elements 119. Each heating element includes substantially vertically extending plates of electric-insulating 121, such as mica, and a resistor wire or strip 123 positioned thereon each heating resistor being substantially uniformly distributed on its supporting plate in substantially the same manner as was hereinbefore described in connection with the heating elements in Figs. 1 to 4 inclusive. Reference may here be made to Ireland application Serial No. 151,221 filed June 30, 1937, and assigned to the same assignee as is the present application for further description of all of the details of such a toaster. A toaster of this kind includes bread slice supports 125 vertically movable in the toaster and adapted to individually support slices of bread 127. Guard wires 129 embodying my invention are supported from top frame plates 41 adjacent the top part of casing 113 depending therefrom and extending through bottom plate 117. Each of the guard wires 129 is provided with an intermediate bowed-out portion as shown in Figs. 5 and 6 of the drawings so that when a bread slice support 125 has been moved to its lowermost or toasting position, as shown in Fig. 6 of the drawings, a slice of bread 127 is held by the guard wire in proper operative position between each pair of heating elements at its top and bottom edges only in substantially the same manner as has already been described for the form of guard wire shown particularly in Figs. 2 and 3 of the drawings.

A guard wire 131 of slightly different shape than those shown in Figs. 1 to 6 is illustrated in Fig. 7. This guard wire 131 has relatively short alined end portions and a relatively long arcuate intermediate portion and may be used in either form of toaster shown in the drawings.

I have found that the use of guard wires in this shape effectively prevent the occurrence of untoasted linearly extending areas on a slice of bread thereby improving the appearance of a piece of toast when served.

I desire that all further modifications are to be considered as being covered by the appended claims which are to be limited only by the prior art.

I claim as my invention:

1. In a toaster, the combination with a pair of spaced substantially uniformly distributed heating elements, and a bread slice support between said pair of heating elements, of a plurality of guard wires between heating element and a slice of bread resting on said support, said guard wires each having an intermediate portion spaced farther from a slice of bread than the end portions thereof to position a slice of bread being toasted by engagement with the guard wires at its top and its bottom edges only.

2. In a toaster, the combination with a toasting chamber structure comprising a top and a bottom wall, a pair of spaced planar substantially uniformly distributed heating elements and a bread slice support movable between said heating elements, of a plurality of guard wires between said bread slice support and each of said heating elements, said guard wires being held in substantially fixed positions by the top and the bottom wall and each guard wire having a bent-out intermediate portion positioned nearer to the heating elements than the end portions, a slice of bread resting on said support during a toasting operation being engaged by the end portions only of the guard wires to be positioned thereby between the heating elements.

3. In a toaster, the combination with a pair of spaced planar substantially uniformly distributed heating elements extending in a substantially vertical direction and a bread slice support vertically movable between said spaced heating elements, of a plurality of guard wires supported at their upper ends adjacent to the top edges of the heating elements and slidably interfitting with said bread slice support, each of said guard wires having an intermediate portion thereof positioned at a greater distance from a slice of bread resting on the support than the end portions of the guard wires, when the bread slice support is in its lowermost position.

4. In a toaster, the combination with a pair of spaced planar substantially uniformly distributed heating elements extending in a substantially vertical direction and a bread slice support vertically movable between said spaced heating elements, of a plurality of guard wires supported at their upper ends adjacent to the top edges of the heating elements and slidably interfitting with said bread slice support, each of said guard wires having an intermediate portion thereof shaped to be positioned away from a slice of bread on the support and movable by the bread slice support, when the same is moved downwardly, into positioning engagement with the top and bottom edges only of a slice of bread on the support.

5. In a toaster, the combination with a pair of spaced planar substantially uniformly distributed heating elements extending in a substantially vertical direction and a bread slice support vertically movable between said spaced heating elements into a lower toasting position and an upper non-toasting position, of a plurality of guard wires supported at their upper ends adjacent to the top edges of the heating elements and extending through the bread slice support, each of said guard wires being so designed and constructed that it will be in positioning engagement with a slice of bread at only the top and the bottom edge thereof when the support and a slice of bread thereon are in the lower position.

VICTOR SEROTA.